United States Patent
Tsai et al.

(10) Patent No.: US 9,578,712 B2
(45) Date of Patent: Feb. 21, 2017

(54) METHOD AND DEVICE FOR CONTROLLING LED DISPLAY OF WEARABLE SMART EQUIPMENT

(71) Applicant: INVENTEC APPLIANCES CORP., New Taipei (TW)

(72) Inventors: Shih-Kuang Tsai, Shanghai (CN); Xu-Dong Chen, Shanghai (CN)

(73) Assignee: INVENTEC APPLIANCES CORP., New Taipei (TW)

( * ) Notice: Subject to any disclaimer, the term of this patent is extended or adjusted under 35 U.S.C. 154(b) by 231 days.

(21) Appl. No.: 14/328,437

(22) Filed: Jul. 10, 2014

(65) Prior Publication Data
US 2015/0130370 A1 May 14, 2015

(30) Foreign Application Priority Data
Nov. 8, 2013 (CN) .......................... 2013 1 0554306

(51) Int. Cl.
G05B 11/01 (2006.01)
H05B 33/08 (2006.01)
H05B 37/02 (2006.01)

(52) U.S. Cl.
CPC ....... H05B 33/0857 (2013.01); H05B 37/029 (2013.01); Y02B 20/48 (2013.01)

(58) Field of Classification Search
CPC ........... G05B 15/02; G05B 12/02; G09G 3/20
(Continued)

(56) References Cited

U.S. PATENT DOCUMENTS 4,093,992 A     6/1978  Kawamura et al.
2012/0253485 A1* 10/2012 Weast ................ G06F 1/163
                                                   700/91
(Continued)

FOREIGN PATENT DOCUMENTS

CN    103212197 A    7/2013
TW    200402612 A    7/1992
(Continued)

OTHER PUBLICATIONS

Taiwanese Office Action, 103119869, see pp. 5-6 dated May 27, 2016.

*Primary Examiner* — Minh D A
(74) *Attorney, Agent, or Firm* — Foster Pepper PLLC

(57) ABSTRACT

The present invention provides a method and a device for controlling an LED display of a wearable smart equipment, comprising: setting a plurality of LED display patterns which correlate to predetermined information of the wearable smart equipment; if a first display triggering signal is received, then determining a function information display type according to the first display triggering signal; and if the function information display type indicates that the LED display pattern to be implemented correlates to a predetermined information, then reading a current predetermined information of the wearable smart equipment, determining the LED display pattern according to the current predetermined information, and making the LEDs of the wearable smart equipment implement the LED display pattern that correlates to the current predetermined information, where the LED display patterns comprises lighting up, lighting out, flashing, changing display colors/position, changing display frequencies, changing display durations, changing of display order and any combination thereof.

14 Claims, 6 Drawing Sheets

(58) Field of Classification Search
USPC .................. 700/11, 12, 13, 14, 15, 16, 17; 345/204–205, 207, 690
See application file for complete search history.

(56) References Cited

U.S. PATENT DOCUMENTS

2013/0278631 A1* 10/2013 Border ................. G02B 27/017
    345/633
2016/0116978 A1* 4/2016 Li .......................... G06F 3/013
    345/156

FOREIGN PATENT DOCUMENTS

| TW | 518410 B | 1/2003 |
| TW | 256096 | 2/2005 |
| TW | M296999 | 9/2006 |
| TW | 200813668 A | 3/2008 |
| TW | M434963 U1 | 8/2012 |
| WO | WO 2012/131584 A2 | 10/2012 |

* cited by examiner

METHOD AND DEVICE FOR CONTROLLING LED DISPLAY OF WEARABLE SMART EQUIPMENT

PRIORITY CLAIM

This application claims the benefit of the filing date of Chinese Patent Application No. 201310554306.7, filed Nov. 8, 2013, entitled "A METHOD AND DEVICE FOR CONTROLLING LED DISPLAY OF WEARABLE SMART EQUIPMENT," and the contents of which are hereby incorporated by reference in their entirety.

FIELD OF THE INVENTION

The present invention relates to a field of smart equipment technology, more particularly, to a method and device for controlling an LED display of wearable smart equipment.

BACKGROUND

In recent years, wearable equipment with new concepts have begun emerging progressively. The principle of these wearable equipment is to integrate different kinds of sensor technology and wireless transmission technology into the equipment, downsize the equipment, and make the wearable equipment more practical. For example, smart bracelets are a type of wearable equipment that can collect exercise data, sleep data, heart rate data, blood pressure data and body temperature data according to different sensors of the equipment. The smart bracelet can also connect to wireless mobile devices, such as mobile phones, tablets, PDAs, PCs or cloud servers and then transmit the data from the smart bracelet synchronously.

In the prior art, the display device of wearable equipment usually displays information through an LED display. If the amount of LEDs are increased, the displayed information will be more complete, specific and clear, but concurrently increased power consumption. If the amount of LEDs are decreased, the power consumption will decrease, however, it will not be able to display as much information.

SUMMARY OF THE INVENTION

The present invention is generally direct to a method and device for controlling an LED display of a wearable smart equipment to solve the problem that an LED display of a wearable smart equipment not being able to display information completely while saving energy.

In one aspect of the present invention, a method of controlling an LED display of a wearable smart equipment, said wearable smart equipment comprising a plurality of LEDs, the method includes the steps of (1) setting a plurality of LED display patterns which correlate to mode information, time information, progress information, and power information of the wearable smart equipment; (2) if a first display triggering signal is received, determining a function information display type according to the first display triggering signal, wherein the function information display type indicates which of the LED display patterns is to be implemented; (3) if the function information display type indicates that the LED display pattern to be implemented correlates to mode information, reading a current mode information of the wearable smart equipment, determining the LED display pattern according to the current mode information, and making the LEDs of the wearable smart equipment implement the LED display pattern that correlates to the current mode information; (4) if the function information display type indicates that the LED display pattern to be implemented correlates to time information, reading a current time information of the wearable smart equipment, determining the LED display pattern according to the current time information, and making the LEDs of the wearable smart equipment implement the LED display pattern correlating to the current time information; (5) if the function information display type indicates that the LED display pattern to be implemented correlates to progress information, reading a current progress information of the wearable smart equipment, determining the LED display pattern according to the current progress information, and making the LEDs of the wearable smart equipment implement the LED display pattern correlating to the current progress information; (6) if the function information display type indicates that the LED display pattern to be implemented correlates to power information, reading a current power information of the wearable smart equipment, determining the LED display pattern according to the current power information, and making the LEDs of the wearable smart equipment implement the LED display pattern correlating to the current power information; and (7) if the function information display type indicates that the LED display pattern to be implemented correlates to other information, reading a current other information of the wearable smart equipment, determining the LED display pattern according to the current other information, and making the LEDs of the wearable smart equipment implement the LED display pattern correlating to the current other information.

In another aspect of the present invention, a method of controlling an LED display of a wearable smart equipment, said wearable smart equipment comprising a plurality of LEDs, the method includes the steps of (1) setting a plurality of LED display patterns which correlate to a predetermined information of the wearable smart equipment; (2) if a first display triggering signal is received, determining a function information display type according to the first display triggering signal; and (3) if the function information display type indicates that the LED display pattern to be implemented correlates to predetermined information, reading a current predetermined information of the wearable smart equipment, determining the LED display pattern according to the current predetermined information, and making the LEDs of the wearable smart equipment implement the LED display pattern correlating to the current predetermined information.

In yet another embodiment of the present invention, an LED display device applicable to a wearable smart equipment comprising a plurality of LEDs, the LED display device includes a storage unit, for storing a correlating relationship between a plurality of LED display patterns and mode information, time information, progress information and power information of the wearable smart equipment; a first determining unit, for determining which of the LED display patterns is to be implemented according to a first display triggering signal if the first display triggering signal is received; a first display module, configured for implementing the LED display pattern that correlates to the mode information according to the correlating relationship between the LED display pattern and the mode information of the wearable smart equipment; a second display module, configured for implementing the LED display pattern that correlates to the time information according to the correlating relationship between the LED display pattern and the time information of the wearable smart equipment; a third display module, configured for implementing the LED display pattern that correlates to the progress information according to the correlating relationship between the LED display pattern and the progress information of the wearable smart equipment; a fourth display module, configured for implementing the LED display pattern that correlates to the power information according to the correlating relationship between the LED display pattern and the power information of the wearable smart equipment; and a fifth display module, configured for implementing the LED display pattern that correlates to the other information according to the correlating relationship between the LED display pattern and the other information of the wearable smart equipment.

Many other advantages and features of the present invention will be further understood by the following detailed description and the appended drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

The present invention provides a method and device for controlling an LED display of wearable smart equipment, which can solve the problem of LED displays of wearable smart equipment not being able to display information completely while saving energy in the prior art. The present invention sets a plurality of LED display patterns which correlate to mode information, time information, progress information, power information, and other information of each kinds of wearable smart equipment. Using the different LED display patterns to display mode information, time information, progress information, and power information will minimize the amount of LEDs needed for displaying information completely, wherein the LED display patterns comprise lighting up, lighting out, flashing, changing of display colors, changing of display position, changing of display frequency, changing of display duration, changing of display order and any combination thereof. Therefore, the present invention can display information completely and concurrently saving energy, which satisfies the demands of the producer and the consumer.

Figure 1:
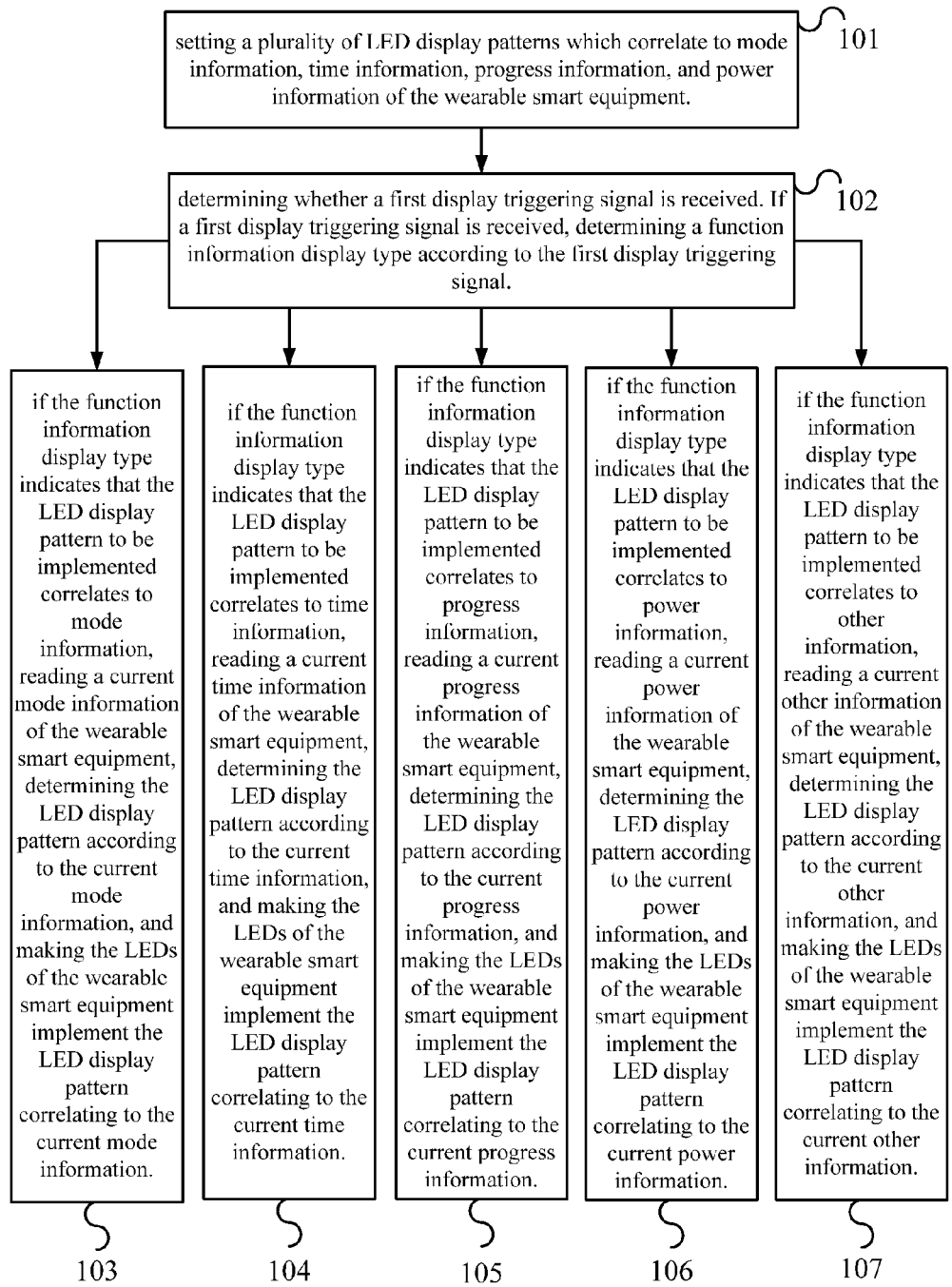
FIG. 1 is a flow chart of a method for controlling an LED display of wearable smart equipment in the first embodiment of the invention.

Please refer to FIG. 1, which is a flow chart of a method for controlling an LED display of wearable smart equipment in the first embodiment of the invention. In this embodiment, the present invention provides a method for controlling an LED display of a wearable smart equipment, where said wearable smart equipment comprises a plurality of LEDs, and the method comprises the following steps of:

Step 101: setting a plurality of LED display patterns which correlate to mode information, time information, progress information, and power information of the wearable smart equipment.

The method of controlling an LED display of a wearable smart equipment of the present invention, said wearable smart equipment comprising a plurality of LEDs, such as one, two, three, four, five, six, twelve, fifteen, eighteen, twenty, twenty-four, twenty-five or thirty. When the amount of LED is between one and twenty, the LEDs can be arranged circularly or linearly, which means to be arranged in a line or a row. The LEDs also can be arranged in a matrix. The minimum scale of the matrix is usually 3×5. Based on the way the LEDs are arranged mentioned above, the present invention can add an amount of LEDs in a line or in a row. The amount of LEDs of the present invention is not limited by the present invention and the wearable smart equipment can be a smart bracelet, which also is not limited by the present invention.

The wearable smart equipment, which comprises a plurality of LEDs, sets a plurality of LED display patterns which correlate to each mode information, time information, progress information, and power information of the wearable smart equipment, such as the LED display patterns displayed in exercising mode or the LED display patterns displayed in sleeping mode, and save the correlation between the LED display patterns and the function information.

In one embodiment of the present invention, the LED display patterns comprises lighting up, lighting out, flashing, changing display colors, changing display positions, changing display frequencies, changing display durations, changing display orders and any combination thereof.

Among the LED display patterns, the LED changing effects can be achieved by changing display positions, changing display frequencies, changing display durations, or changing display orders. The LED changing effects are achieved based on persistence of vision.

Specifically, in practice, we can provide a list of the amount of LEDs, the way it is arranged, the function information and the correlated display patterns of different wearable smart equipment as TAB. 1.

TABLE 1

FUNCTION INFORMATION AND CORRELATED DISPLAY PATTERNS

| Amount of LED | Arranged way | Function information | | | | | Display pattern | | | |
|---|---|---|---|---|---|---|---|---|---|---|
| | | sleeping | exercising | time | progress | power | lighting | flashing | color | movement |
| 1 | 1 row | √ | √ | √ | √ | √ | √ | √ | √ | x |
| 2 | 1 row | √ | √ | √ | √ | √ | √ | √ | √ | x |
| 3 | 1 row | √ | √ | √ | √ | √ | √ | √ | √ | x |
| 4 | 1 row | √ | √ | √ | √ | √ | √ | √ | √ | x |
| 5 | 1 row | √ | √ | √ | √ | √ | √ | √ | √ | x |
| 6 | 1 row | √ | √ | √ | √ | √ | √ | √ | √ | x |
| 12 | 1 row or clock form | √ | √ | √ | √ | √ | √ | √ | √ | x |
| 15 | 3 × 5 | √ | √ | √ | √ | √ | √ | √ | √ | √ |
| 18 | 3 × 6 | √ | √ | √ | √ | √ | √ | √ | √ | √ |
| 20 | 4 × 5 | √ | √ | √ | √ | √ | √ | √ | √ | √ |
| 24 | 4 × 6 | √ | √ | √ | √ | √ | √ | √ | √ | √ |
| 25 | 5 × 5 | √ | √ | √ | √ | √ | √ | √ | √ | √ |
| 30 | 5 × 6 | √ | √ | √ | √ | √ | √ | √ | √ | √ |

TAB. 1 comprises the relationship between the amount of LEDs, the way they are arranged, their function information and the LED display patterns. In practice, the relationship between the LED display patterns and the wearable smart equipment of the present invention and each mode information, time information, progress information and power information of every wearable smart equipment is not limited by TAB. 1.

Step 102: determining whether a first display triggering signal is received. If the first display triggering signal is received, determining a function information display type according to the first display triggering signal.

The first display triggering signal can be used to trigger the displaying of function information. According to different kind of first display triggering signal, the mode display, time display, progress display, power display or other function information display can be triggered.

Step 103: if the function information display type indicates that the LED display pattern to be implemented correlates to mode information, reading the current mode information of the wearable smart equipment, determining the LED display pattern according to the current mode information, and making the LEDs of the wearable smart equipment implement the LED display pattern correlating to the current mode information;

For example, if the current mode information is exercising mode, determining the LED display pattern according to the exercising mode, then making the LEDs of the wearable smart equipment implement the LED display pattern that correlates to the exercising mode.

In some embodiments of the present invention, when the LEDs of the wearable smart equipment are arranged linearly or circularly, the LED display pattern correlating to each mode information are different LED display patterns correlating to each mode information.

When the LEDs of the wearable smart equipment are arranged in a matrix, the LED display pattern correlating to each mode information are LED displays of different patterns or numerals correlating to each mode information.

In practice, the LED display pattern correlating to each mode information can be set according to the amount of LEDs and the position of the LEDs. For example, when the wearable smart equipment comprises one or two LEDs, the LED display pattern makes the LED light up in exercising mode, or makes the LED flash in sleeping mode; when the wearable smart equipment comprises three or four LEDs, the LED display pattern makes the LED light up in exercising mode, or makes one or two of the LEDs flash; when the wearable smart equipment comprises five LEDs, the LED display pattern makes the LED light up in exercising mode, or makes the LED alternately flash; the LEDs of the wearable smart equipment can be designed to be arranged in a ring form with an LED added in the middle of the ring. Then the LED display pattern can be make the ring of the LEDs light up in exercising mode, or make the LED in the middle of the ring flash in sleeping mode. In conclusion, the mode information is correlating to the LED display types, and each mode information correlates to different LED display pattern.

When the LED is arranged in a matrix, the LED can display different patterns or numerals that represent different mode information. For example, the LED display pattern can use fifteen LEDs to display numerals "1" in exercising mode, and use fifteen LEDs to display "2" in sleeping mode.

Step 104: if the function information display type indicates that the LED display pattern to be implemented correlates to time information, then reading a current time information of the wearable smart equipment, determining the LED display pattern according to the current time information, and making the LEDs of the wearable smart equipment implement the LED display pattern that correlates to the current time information.

In some embodiments of the present invention, when the LEDs of the wearable smart equipment are arranged linearly, the step of implementing the LED display pattern that correlates to the time information comprises: turning the LEDs on/off and/or making the LEDs flash a specific number of times according to the current time information;

When the LEDs of the wearable smart equipment are arranged circularly, the step of implementing the LED display pattern that correlates to the time information comprises turning the specific LEDs on/off and/or making the specific LEDs flash according to the current time information;

When the LEDs of the wearable smart equipment are arranged in a matrix, the step of implementing the LED display pattern correlating to the time information comprises turning the specific LEDs on/off to form the numerals according to the current time information.

In practice, the display type correlating to the time information can be divided into three types:

The LEDs can be arranged linearly when the amount of LEDs is less than six. The step of implementing the LED display pattern that correlates to the time information comprises turning the LEDs on/off and/or making the LEDs flash a specific number of times according to the current time information. The number of times turning the LEDs on represents the hour, while the number of times the LEDs flashing represents the minute. The range of the amount of the lightened LEDs is between one and twelve. For example, if the wearable smart equipment comprises three LEDs, turning one of the LEDs on represents one hour, and making one LED flash means the minute is within zero to twenty. Therefore, making three LEDs flashing represents forty to sixty minutes. In practice, if the time information is 12:45, the three LEDs are controlled to turn on four times, which means the hour is twelve. After that, the three LEDs are controlled to turn off and then begin to flash, where the time information is then displayed completely.

The LEDs can be arranged circularly when the amount of LEDs of the wearable smart equipment is twelve. The LED display pattern for displaying the time information can be similar to a clock. For example, the position of the lighting LED represents the position of hour hand and the position of the flashing LED represents the position of minute hand. In practice, for example, if the LEDs are lighting and flashing at the position of "three o'clock", it means the time information is 3:15.

The LEDs can be arranged in a matrix when the amount of LEDs is more than fifteen. The step of implementing the LED display pattern that correlates to the time information comprises turning the specific LEDs on/off to form the numerals according to the current time information.

Step 105: if the function information display type indicates that the LED display pattern to be implemented correlates to progress information, then reading a current progress information of the wearable smart equipment, determining the LED display pattern according to the current progress information, and making the LEDs of the wearable smart equipment implement the LED display pattern that correlates to the current progress information.

In some embodiments of the present invention, the step of implementing the LED display pattern that correlates to the progress information comprises turning on a specific number of the LEDs according to the current progress information.

In practice, for calculating the rate of progress each LED represents, divide one hundred by the number of the LEDs, then the rate of progress each LED represents is determined by the quotient. For example, if the amount of LED is five, then one lighting LED represents twenty percent. When four LEDs are lighting and the forth LED is flashing, it represents that the rate of progress is over eighty percent, which means the rate of progress is between eighty-one percent and one hundred percent. Therefore, the greater the number of LEDs means that the representation of progress information can be more precise.

Step 106: if the function information display type indicates that the LED display pattern to be implemented correlates to power information, then reading a current power information of the wearable smart equipment, determining the LED display pattern according to the current power information, and making the LEDs of the wearable smart equipment implement the LED display pattern that correlates to the current power information.

In some embodiments of the present invention, the step of implementing the LED display pattern that correlates to the power information comprises turning on a specific number of the LEDs according to the current power information.

The LED display pattern that correlates to the power information is similar to the LED display pattern correlating to the progress information. The power information is represented by the amount of lighting LEDs.

Step 107: if the function information display type indicates that the LED display pattern to be implemented correlates to other information, then reading a current other information of the wearable smart equipment, determining the LED display pattern according to the current other information, and making the LEDs of the wearable smart equipment implement the LED display pattern correlating to the current other information.

It's worth noting that in some embodiments of the present invention, the information displayed by the LED is not limited to the mode information, time information, progress information, or power information. The present invention can display other information according to any practical case. For example, the present invention can further display the transmit information of the wearable smart equipment.

According to the statement mentioned above, the present invention sets a plurality of LED display patterns that correlate to the mode information, time information, progress information, and power information of different kinds of wearable smart equipment. Using different LED display patterns to display mode information, time information, progress information, and power information will allow the amount of the LED to be as minimal as possible for completely displaying information. Therefore, the power consumption and the cost of wearable smart equipment can be reduced, which satisfies both the demands of the producer and the consumer.

In some embodiments of the present invention, the method further comprises the following steps of: setting the LED display patterns that correlates to each kind of sign information of the wearable smart equipment; and if the first display triggering signal is not received, and a second display triggering signal is received, then reading the current sign information, making the LEDs of the wearable smart equipment implement the LED display pattern that correlates to the sign information, wherein the second display triggering signal is sent automatically by the wearable smart equipment under a specific circumstance.

The second display triggering signal can be used to trigger the LED display patterns correlate to the sign information to display. The sign information comprises wireless matching, wireless connecting, data synchronizing, goal achieving and low power warning. The second display triggering signal is sent automatically according to a specific circumstance of the system. For example, when the battery remaining percentage is under a low power condition, the second display triggering signal will be triggered automatically and then a low power warning will be triggered to display.

Figure 2:
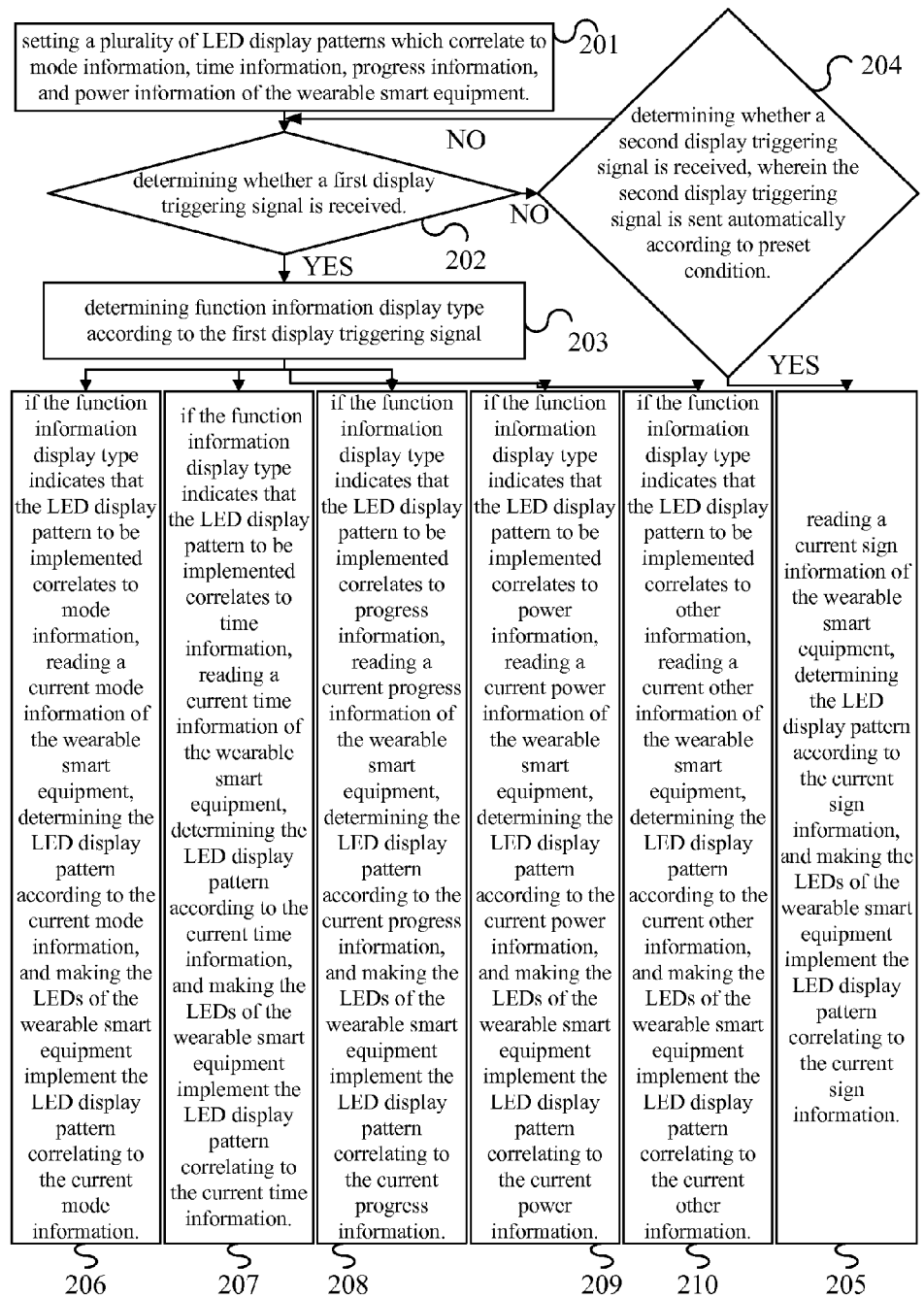
FIG. 2 is a flow chart of a method for controlling an LED display of wearable smart equipment in the second embodiment of the invention.

Please refer to FIG. 2 which illustrates a flow chart of a method for controlling the LED display of wearable smart equipment in the second embodiment of the invention. A method of controlling an LED display of a wearable smart equipment, where said wearable smart equipment comprises a plurality of LEDs, the method comprising:

Step 201: setting a plurality of LED display patterns which correlates to mode information, time information, progress information, and power information of the wearable smart equipment.

Step 202: determining whether a first display triggering signal is received. If the first display triggering signal is received, perform step 203. If the first display triggering signal is not received, perform step 204.

Step 203: determining the function information display type according to the first display triggering signal, and then perform step 206.

Step 204: determining whether a second display triggering signal is received, wherein the second display triggering signal is sent automatically under a specific circumstance. If the second display triggering signal is received, enter step 205. If the second display triggering signal is not received, return to step 202.

Step 205: reading current sign information of the wearable smart equipment, then determining the LED display pattern according to the current sign information, and making the LEDs of the wearable smart equipment implement the LED display pattern that correlates to the current sign information.

Step 206: if the function information display type indicates that the LED display pattern to be implemented correlates to mode information, then reading a current mode information of the wearable smart equipment, determining the LED display pattern according to the current mode information, and causing the LEDs of the wearable smart equipment to implement the LED display pattern that correlates to the current mode information.

Step 207: if the function information display type indicates that the LED display pattern to be implemented correlates to time information, then reading a current time information of the wearable smart equipment, determining the LED display pattern according to the current time information, and causing the LEDs of the wearable smart equipment to implement the LED display pattern that correlates to the current time information.

Step 208: if the function information display type indicates that the LED display pattern to be implemented correlates to progress information, then reading a current progress information of the wearable smart equipment, determining the LED display pattern according to the current progress information, and causing the LEDs of the wearable smart equipment to implement the LED display pattern that correlates to the current progress information.

Step 209: if the function information display type indicates that the LED display pattern to be implemented correlates to power information, then reading a current power information of the wearable smart equipment, determining the LED display pattern according to the current power information, and causing the LEDs of the wearable smart equipment to implement the LED display pattern that correlates to the current power information.

Step 210: if the function information display type indicates that the LED display pattern to be implemented correlates to other information, then reading a current other information of the wearable smart equipment, determining the LED display pattern according to the current other information, and causing the LEDs of the wearable smart equipment to implement the LED display pattern that correlates to the current other information.

In embodiments of the present invention, the LED display patterns correlate to function information and sign information displayed by the LEDs helps the LED display of the wearable smart equipment to minimize the amount of LEDs used for displaying each kind of information completely.

Figure 3:
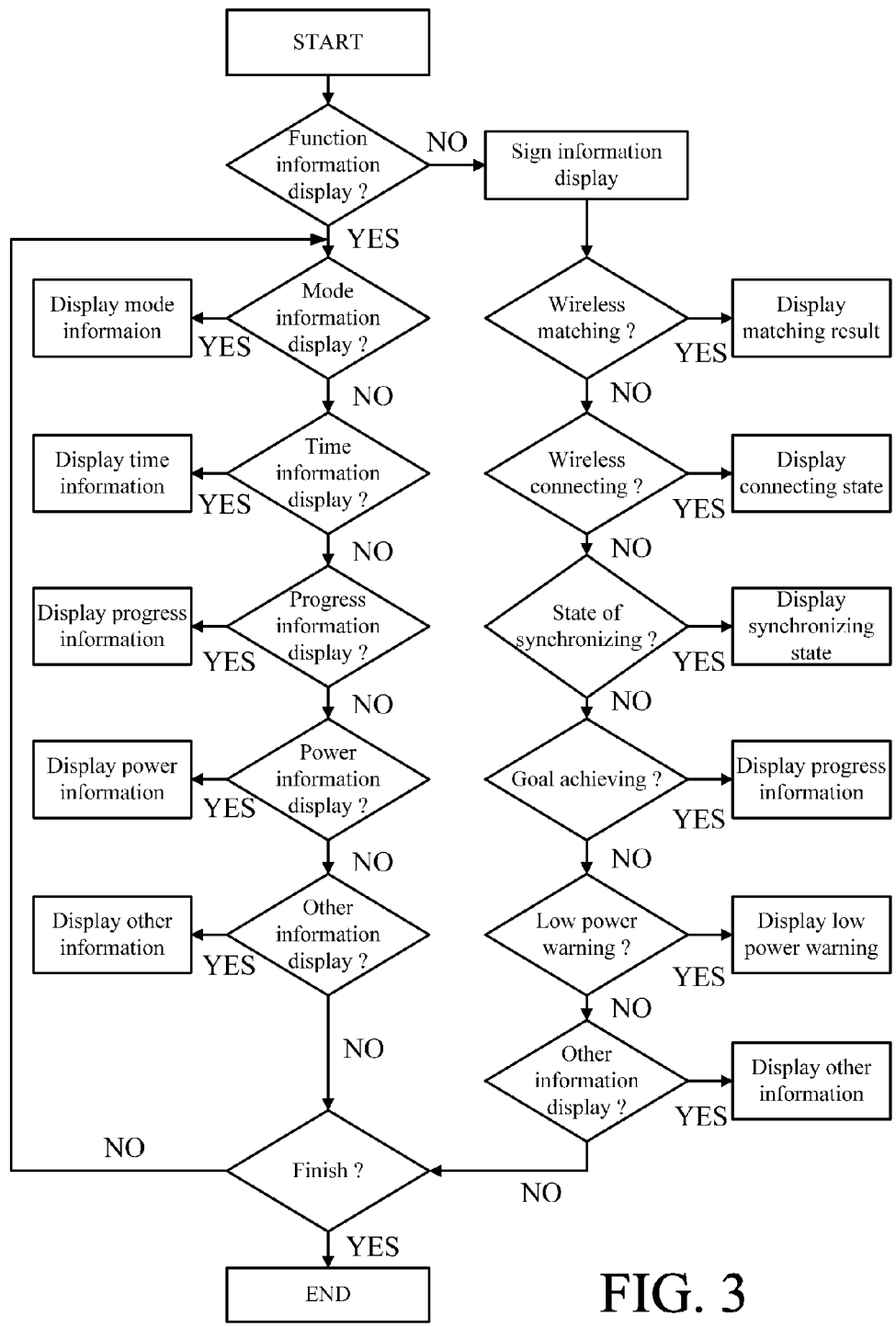
FIG. 3 is a flow chart of a method for controlling an LED display of wearable smart equipment in the third embodiment of the invention.

In practice, please refer to FIG. 3, which is a flow chart of a method for controlling an LED display of wearable smart equipment in the third embodiment of the invention.

A method of controlling an LED display of wearable smart equipment can be divided into two parts, which is either for displaying function information or displaying sign information. The function information includes but not limited to mode information, time information, progress information, power information and other information. The sign information includes but not limited to wireless matching, wireless connecting, data synchronizing, goal achieving and low power warning.

When the first display triggering signal is received, then perform the steps of displaying the function information. The first display triggering signal is triggered by a user. The function information display type is determined according to a first display triggering signal. For example, the user taps the wearable smart equipment softly two times to display the mode information. The present invention also reads the current mode information, such as an exercising mode or sleeping mode, then determines the LED display pattern according to the current mode information, and causes the LEDs of the wearable smart equipment to implement the LED display pattern that correlates to the current mode information. Correlational resources, such as character form, are sent into a display cache and cause the LEDs of the wearable smart equipment to implement the LED display pattern that correlates to the current mode information. The method can further cause the LED to turn off automatically according to a preset time interval to save power. For example, the user taps the wearable smart equipment softly three times to display the time information, with the LED displaying method being similar to the statement mentioned above. The progress information, power information or other information is displayed and can be entered according to the different first display triggering signal.

When the second display triggering signal is received, perform the steps of displaying sign information. The second display triggering signal is not triggered by user. The second display triggering signal is triggered automatically under a specific circumstance, such as when the goal is achieved or the power is low. Furthermore, when the wearable smart equipment is wirelessly matched or wirelessly connected to other equipment according to the specific condition, the sign information, which comprises a matching result or the state of the connection, will be displayed. For example, when the LEDs light up for two seconds and then turn off, it means that the matching has completed. When the LEDs continue flashing, it means the matching has failed. When in the process of data synchronization, if the LEDs are flashing, it means the data is synchronizing and when the LEDs turn off, it means the process has completed. When the sign information displayed is completed, we can quit the LED display controlling.

Figure 4:
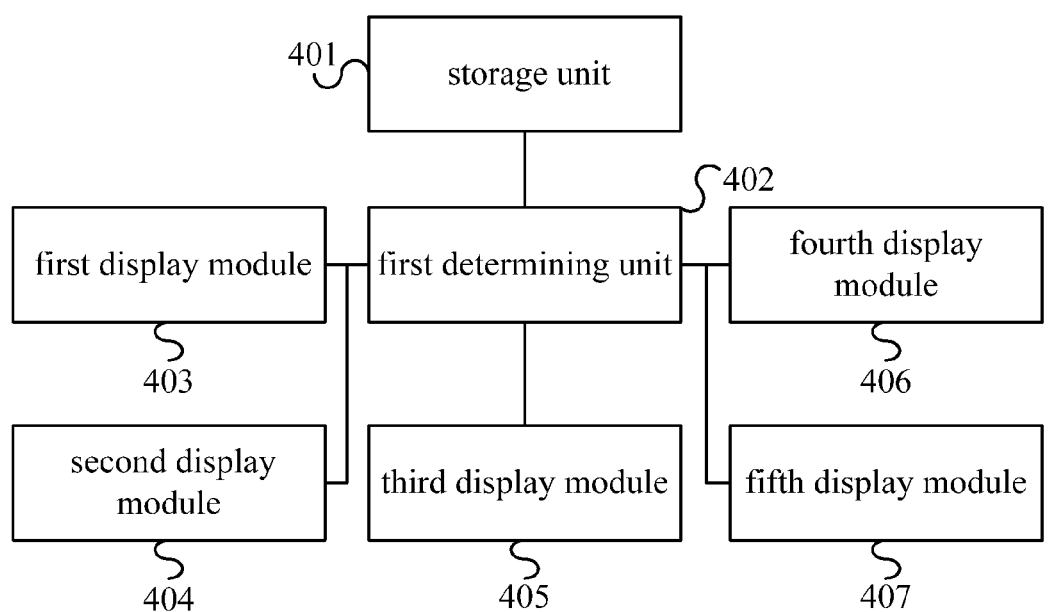
FIG. 4 is a flow chart of device for controlling an LED display of wearable smart equipment in the first embodiment of the invention.

Please refer to FIG. 4, which is a flow chart of a device for controlling the LED display of wearable smart equipment in the first embodiment of the invention. An LED display device applicable to a wearable smart equipment comprises a plurality of LEDs, the LED display device comprising:

A storage unit 401, for storing a correlating relationship between a plurality of LED display patterns and mode information, time information, progress information and power information of the wearable smart equipment.

In this embodiment of the present invention, the LED display patterns comprises lighting up, lighting out, flashing, changing display colors, changing display positions, changing display frequencies, changing display duration, changing display order and any combination thereof.

A first determining unit 402 is used for determining whether a first display triggering signal is received or not. If the first display triggering signal is received, determining a function information display type according to the first display triggering signal.

A first display module 403, used for reading a current mode information of the wearable smart equipment, determining the LED display pattern according to the current mode information, and making the LEDs of the wearable smart equipment implement the LED display pattern that correlates to the current mode information if the function information display type indicates that the LED display pattern to be implemented correlates to mode information.

In some embodiments of the present invention, when the LEDs of the wearable smart equipment are arranged linearly or circularly, each LED display pattern is correlating to each mode information.

When the LEDs of the wearable smart equipment are arranged in a matrix, the LED display pattern that correlates to each mode information are LED displaying different patterns or numerals that correlate to each mode information.

A second display module 404, used for reading a current time information of the wearable smart equipment, determining the LED display pattern according to the current time information, and making the LEDs of the wearable smart equipment implement the LED display pattern that correlates to the current time information if the function information display type indicates that the LED display pattern to be implemented correlates to time information.

In some embodiments of the present invention, when the LEDs of the wearable smart equipment are arranged linearly, the step of implementing the LED display pattern that correlates to the time information comprises turning the LEDs on/off and/or making the LEDs flash for a specific number of times according to the current time information;

When the LEDs of the wearable smart equipment are arranged circularly, the step of implementing the LED display pattern that correlates to the time information comprises turning the specific LEDs on/off and/or making the specific LEDs flash according to the current time information;

When the LEDs of the wearable smart equipment are arranged in a matrix, the step of implementing the LED display pattern that correlates to the time information comprises turning the specific LEDs on/off to form the numerals according to the current time information.

A third display module 405, used for reading a current progress information of the wearable smart equipment, determining the LED display pattern according to the current progress information, and making the LEDs of the wearable smart equipment implement the LED display pattern that correlates to the current progress information if the function information display type indicates that the LED display pattern to be implemented correlates to progress information.

In some embodiments of the present invention, the step of implementing the LED display pattern that correlates to the progress information comprises turning on a specific number of LEDs according to the current progress information.

A fourth display module 406, used for reading a current power information of the wearable smart equipment, determining the LED display pattern according to the current power information, and making the LEDs of the wearable smart equipment implement the LED display pattern that correlates to the current power information if the function information display type indicates that the LED display pattern to be implemented correlates to power information.

In some embodiments of the present invention, the step of implementing the LED display pattern that correlates to the power information comprises turning on a specific number of LEDs according to the current power information.

A fifth display module 407, used for reading a current other information of the wearable smart equipment, determining the LED display pattern according to the current other information, and making the LEDs of the wearable smart equipment implement the LED display pattern that correlates to the current other information if the function information display type indicates that the LED display pattern to be implemented correlates to other information.

It's worth noting that in some embodiments of the present invention, the function information displayed by the LEDs includes but not limited to mode information, time information, progress information, power information and other information.

Additionally, in some embodiments of the present invention, the storage unit further comprises a correlating relationship between the LED display pattern and sign information of the wearable smart equipment.

In some embodiments of the present invention, the LED display device further comprises:

A second determine unit, for determining whether a second display triggering signal is received when the first display triggering signal is not received.

A sixth display module, configured for implementing the LED display pattern that correlates to the sign information according to the correlating relationship between the LED display pattern and the sign information of the wearable smart equipment, wherein the sixth display module implements the LED display pattern that correlates to the sign information upon the second display triggering signal being received.

Figure 5:
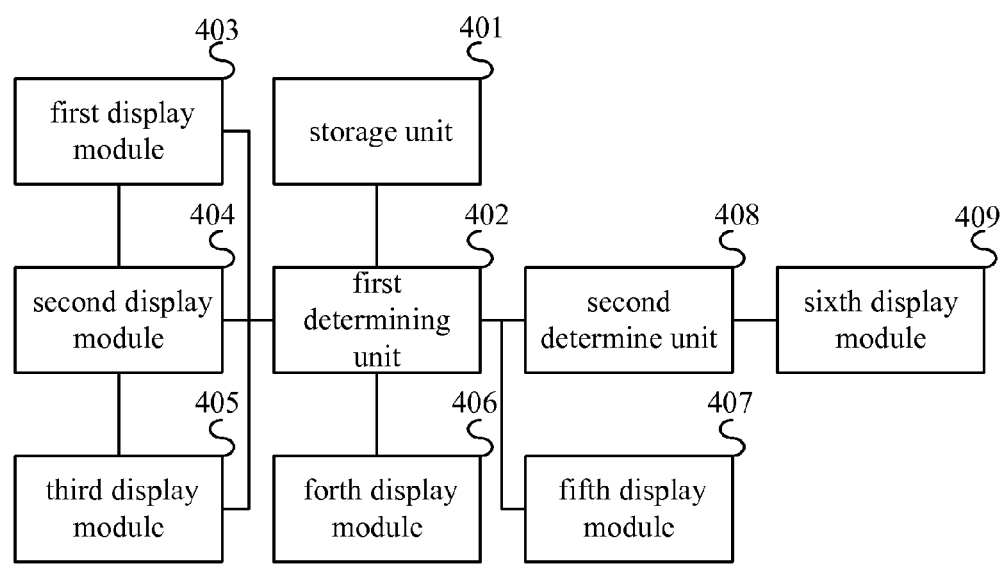
FIG. 5 is a flow chart of device for controlling an LED display of wearable smart equipment in the second embodiment of the invention.

Please refer to FIG. 5. FIG. 5 is a flow chart of a device that controls the LED display of wearable smart equipment in the second embodiment of the invention. A LED display device applicable to a wearable smart equipment comprising a plurality of LEDs, the LED display device comprising:

A storage unit 401, for storing a correlating relationship between a plurality of LED display patterns and mode information, time information, progress information and power information of the wearable smart equipment.

A first determining unit 402, for determining which of the LED display patterns is to be implemented according to a first display triggering signal if the first display triggering signal is received;

A second determine unit 408, for determining whether a second display triggering signal is received when the first display triggering signal is not received, wherein the second display triggering signal is sent automatically by the wearable smart equipment under a specific circumstance.

A first display module 403, configured for implementing the LED display pattern that correlates to the mode information according to the correlating relationship between the LED display pattern and the mode information of the wearable smart equipment.

A second display module 404, configured for implementing the LED display pattern that correlates to the time information according to the correlational relationship between the LED display pattern and the time information of the wearable smart equipment.

A third display module 405, configured for implementing the LED display pattern that correlates to the progress information according to the correlating relationship between the LED display pattern and the progress information of the wearable smart equipment.

A fourth display module 406, configured for implementing the LED display pattern that correlates to the power information according to the correlating relationship between the LED display pattern and the power information of the wearable smart equipment.

A fifth display module 407, configured for implementing the LED display pattern that correlates to the other information according to the correlating relationship between the LED display pattern and the other information of the wearable smart equipment.

A sixth display module 409, configured for implementing the LED display pattern that correlates to the sign information according to the correlating relationship between the LED display pattern and the sign information of the wearable smart equipment, wherein the sixth display module implements the LED display pattern that correlates to the sign information upon the second display triggering signal being received.

Figure 6:
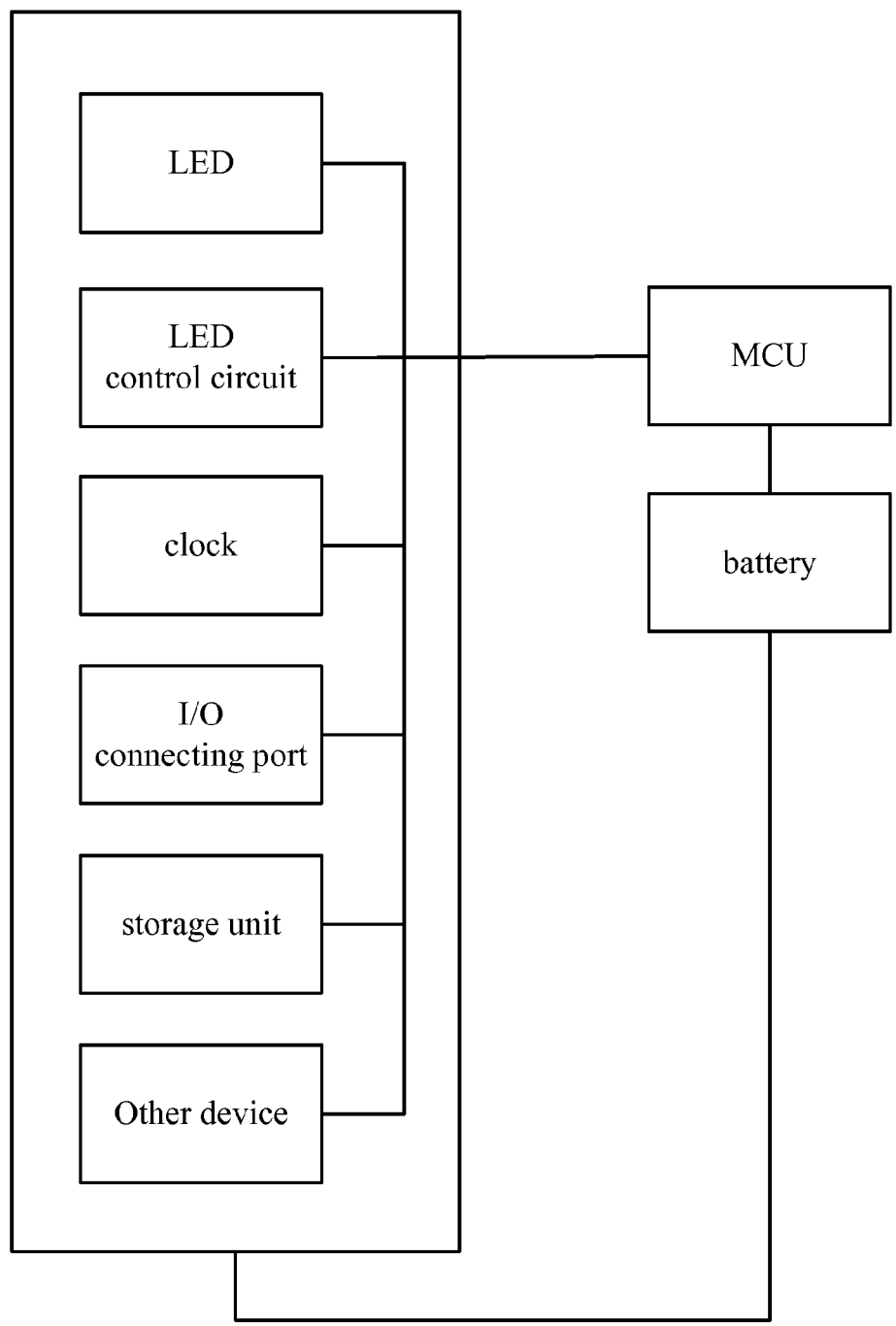
FIG. 6 shows the system structure of the applied wearable smart equipment in an embodiment of the invention.

Please refer to FIG. 6, which shows the system structure of the applied wearable smart equipment to an embodiment of the invention. The wearable smart equipment comprises: a microprocessor (MCU), a plurality of circuits (power circuit, clock circuit, reset circuit), an LED (comprises LED drivers), an LED control circuit, a storage device (RAM, ROM, special register), a plurality of sensors, an input device and an output device. The MCU is a device which can control the LED display of the wearable smart equipment mentioned above. The LED control circuit can drive the LED to display according to a MCU control signal. The clock is mainly used to scan and control the frequency of the LED when the LED is turned on, turned off, or flashed. The storage device mainly comprises ROM, RAM and flash, wherein the LED character form can be stored in the ROM and the LED display cache can use the RAM. Other device comprises a vibrator, an accelerometer, gyroscopes, a thermometer and a heart rate meter but is not limited by these.

Compared to the prior art, the present invention has the following efficacy: the present invention sets a plurality of LED display patterns which correlate to mode information, time information, progress information, and power information of different kinds of wearable smart equipment. Using the different LED display patterns to display mode information, time information, progress information, and power information will minimize the amount of needed LEDs to completely display information. Therefore, the cost of wearable smart equipment can be reduced and the battery life of the wearable smart equipment can be prolonged, which satisfies the demand of producers and consumers.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method of controlling an LED display of a wearable smart equipment, said wearable smart equipment comprising a plurality of LEDs, the method comprising:
   setting a plurality of LED display patterns which correlate to mode information, time information, progress information, and power information of the wearable smart equipment;
   if a first display triggering signal is received, determining a function information display type according to the first display triggering signal, wherein the function information display type indicates which of the LED display patterns is to be implemented;
   if the function information display type indicates that the LED display pattern to be implemented correlates to mode information, reading a current mode information of the wearable smart equipment, determining the LED display pattern according to the current mode information, and making the LEDs of the wearable smart equipment implement the LED display pattern that correlates to the current mode information;
   if the function information display type indicates that the LED display pattern to be implemented correlates to time information, reading a current time information of the wearable smart equipment, determining the LED display pattern according to the current time information, and making the LEDs of the wearable smart equipment implement the LED display pattern correlating to the current time information;
   if the function information display type indicates that the LED display pattern to be implemented correlates to progress information, reading a current progress information of the wearable smart equipment, determining the LED display pattern according to the current progress information, and making the LEDs of the wearable smart equipment implement the LED display pattern correlating to the current progress information;
   if the function information display type indicates that the LED display pattern to be implemented correlates to power information, reading a current power information of the wearable smart equipment, determining the LED display pattern according to the current power information, and making the LEDs of the wearable smart equipment implement the LED display pattern correlating to the current power information; and
   if the function information display type indicates that the LED display pattern to be implemented correlates to other information, reading a current other information of the wearable smart equipment, determining the LED display pattern according to the current other information, and making the LEDs of the wearable smart equipment implement the LED display pattern correlating to the current other information;
   wherein the LED display patterns further correlates to a sign information, further comprising:
   if the first display triggering signal is not received, and a second display triggering signal is received, then making the LEDs of the wearable smart equipment implement the LED display pattern that correlates to the sign information;
      wherein the second display triggering signal is sent automatically by the wearable smart equipment under a specific circumstance.

2. The method of controlling an LED display of a wearable smart equipment of claim 1, wherein the LED display patterns comprise lighting up, lighting out, flashing, changing of display colors, changing of display position, changing of display frequency, changing of display duration, changing of display order and any combination thereof.

3. The method of controlling an LED display of a wearable smart equipment of claim 2, wherein
   when the LEDs of the wearable smart equipment are arranged linearly, the step of implementing the LED display pattern that correlates to the time information comprises: turning the LEDs on/off and/or making the LEDs flash for a specific number of times according to the current time information;

when the LEDs of the wearable smart equipment are arranged circularly, the step of implementing the LED display pattern that correlates to the time information comprises: turning the specific LEDs on/off and/or making the specific LEDs flash according to the current time information; and when the LEDs of the wearable smart equipment are arranged in a matrix, the step of implementing the LED display pattern that correlates to the time information comprises: turning the specific LEDs on/off to form the numerals according to the current time information.

4. The method of controlling an LED display of a wearable smart equipment of claim 2, wherein the step of implementing the LED display pattern that correlates to the progress information comprises: turning on a specific number of the LEDs according to the current progress information; and the step of implementing the LED display pattern that correlates to the power information comprises: turning on a specific number of the LEDs according to the current power information.

5. A method of controlling an LED display of a wearable smart equipment, said wearable smart equipment comprising a plurality of LEDs, the method comprising:

setting a plurality of LED display patterns which correlate to a predetermined information of the wearable smart equipment;

if a first display triggering signal is received, determining a function information display type according to the first display triggering signal; and if the function information display type indicates that the LED display pattern to be implemented correlates to predetermined information, reading a current predetermined information of the wearable smart equipment, determining the LED display pattern according to the current predetermined information, and making the LEDs of the wearable smart equipment implement the LED display pattern correlating to the current predetermined information;

if the first display triggering signal is not received, and a second display triggering signal is received, then making the LEDs of the wearable smart equipment implement the LED display pattern that correlates to the sign information;

wherein the second display triggering signal is sent automatically by the wearable smart equipment under a specific circumstance.

6. The method of controlling an LED display of a wearable smart equipment of claim 5, wherein the predetermined information comprises at least two information selected from the group comprising a mode information, a time information, a progress information, a power information or a other information.

7. The method of controlling an LED display of a wearable smart equipment of claim 6, wherein if the function information display type indicates that the LED display pattern to be implemented correlates to mode information, reading a current mode information of the wearable smart equipment, determining the LED display pattern according to the current mode information, and making the LEDs of the wearable smart equipment implement the LED display pattern that correlates to the current mode information;

if the function information display type indicates that the LED display pattern to be implemented correlates to time information, reading a current time information of the wearable smart equipment, determining the LED display pattern according to the current time information, and making the LEDs of the wearable smart equipment implement the LED display pattern that correlates to the current time information;

if the function information display type indicates that the LED display pattern to be implemented correlates to progress information, reading a current progress information of the wearable smart equipment, determining the LED display pattern according to the current progress information, and making the LEDs of the wearable smart equipment implement the LED display pattern that correlates to the current progress information; and if the function information display type indicates that the LED display pattern to be implemented correlates to power information, reading a current power information of the wearable smart equipment, determining the LED display pattern according to the current power information, and making the LEDs of the wearable smart equipment implement the LED display pattern that correlates to the current power information; and if the function information display type indicates that the LED display pattern to be implemented correlates to other information, reading a current other information of the wearable smart equipment, determining the LED display pattern according to the current other information, and making the LEDs of the wearable smart equipment implement the LED display pattern that correlates to the current other information.

8. The method of controlling an LED display of a wearable smart equipment of claim 7, wherein the LED display patterns comprise lighting up, lighting out, flashing, changing of display colors, changing of display position, changing of display frequency, changing of display duration, changing of display order and any combination thereof.

9. The method of controlling an LED display of a wearable smart equipment of claim 8, wherein when the LEDs of the wearable smart equipment are arranged linearly, the step of implementing the LED display pattern that correlates to the time information comprises: turning the LEDs on/off and/or making the LEDs flash for a specific number of times according to the current time information;

when the LEDs of the wearable smart equipment are arranged circularly, the step of implementing the LED display pattern that correlates to the time information comprises: turning the specific LEDs on/off and/or making the specific LEDs flash according to the current time information; and when the LEDs of the wearable smart equipment are arranged in a matrix, the step of implementing the LED display pattern that correlates to the time information comprises: turning the specific LEDs on/off to form the numerals according to the current time information.

10. The method of controlling an LED display of a wearable smart equipment of claim 8, wherein the step of implementing the LED display pattern that correlates to the progress information comprises: turning on a specific number of the LEDs according to the current progress information; and the step of implementing the LED display pattern that correlates to the power information comprises: turning on a specific number of the LEDs according to the current power information.

11. An LED display device applicable to a wearable smart equipment comprising a plurality of LEDs, the LED display device comprising:

a storage unit, for storing a correlating relationship between a plurality of LED display patterns and mode information, time information, progress information and power information of the wearable smart equipment;

a first determining unit, for determining which of the LED display patterns is to be implemented according to a first display triggering signal if the first display triggering signal is received;

a first display module, configured for implementing the LED display pattern that correlates to the mode information according to the correlating relationship between the LED display pattern and the mode information of the wearable smart equipment;

a second display module, configured for implementing the LED display pattern that correlates to the time information according to the correlating relationship between the LED display pattern and the time information of the wearable smart equipment;

a third display module, configured for implementing the LED display pattern that correlates to the progress information according to the correlating relationship between the LED display pattern and the progress information of the wearable smart equipment;

a fourth display module, configured for implementing the LED display pattern that correlates to the power information according to the correlating relationship between the LED display pattern and the power information of the wearable smart equipment; and a fifth display module, configured for implementing the LED display pattern that correlates to the other information according to the correlating relationship between the LED display pattern and the other information of the wearable smart equipment;

wherein the storage unit further comprises a correlating relationship between the LED display pattern and a sign information, the LED display device further comprises:

a second determine unit, for determining whether a second display triggering signal is received when the first display triggering signal is not received, wherein the second display triggering signal is sent automatically by the wearable smart equipment under a specific circumstance; and a sixth display module, configured for implementing the LED display pattern that correlates to the sign information according to the correlating relationship between the LED display pattern and the sign information of the wearable smart equipment, wherein the sixth display module implements the LED display pattern that correlates to the sign information upon receiving the second display triggering signal.

12. The LED display device of claim 11, wherein the LED display patterns comprise lighting up, lighting out, flashing, changing of display colors, changing of display position, changing of display frequency, changing of display duration, changing of display order and any combination thereof.

13. The LED display device of claim 12, wherein when the LEDs of the wearable smart equipment are arranged linearly, the second display module is further configured for: turning the LEDs on/off and/or making the LEDs flash for a specific number of times according to the current time information;

when the LEDs of the wearable smart equipment are arranged circularly, the second display module is further configured for: turning the specific LEDs on/off and/or making the specific LEDs flash according to the current time information; and when the LEDs of the wearable smart equipment are arranged in a matrix, the second display module is further configured for: turning the specific LEDs on/off to form the numerals according to the current time information.

14. The LED display device of claim 12, wherein the third display module is further configured for: turning on a specific number of LEDs according to the current progress information; and the fourth display module is further configured for: turning on a specific number of LEDs according to the current power information.

\* \* \* \* \*